Patented June 18, 1946

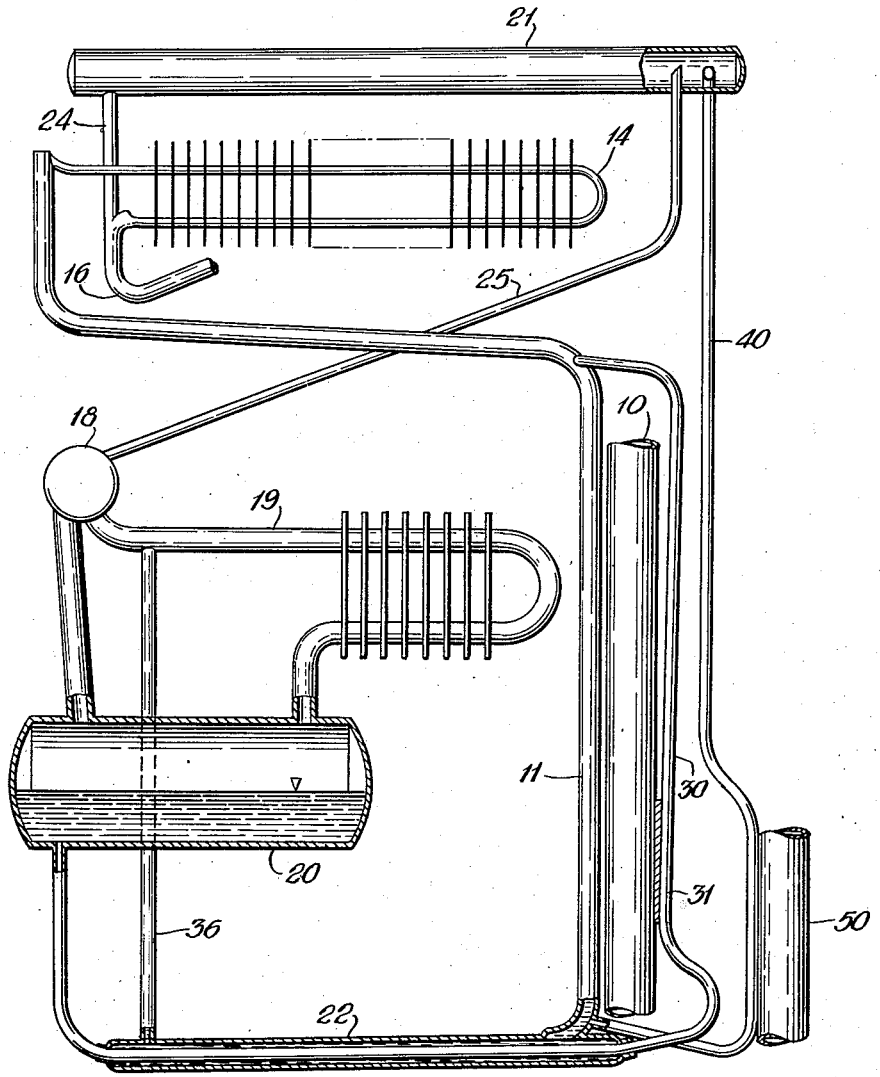

2,402,413

UNITED STATES PATENT OFFICE 2,402,413

ABSORPTION REFRIGERATING APPARATUS

Wilhelm Georg Kögel, Stockholm, Sweden

Application July 4, 1942, Serial No. 449,761
In Sweden May 28, 1941

21 Claims. (Cl. 62—119.5)

My invention relates to hermetically closed, continuously working absorption refrigerating apparatus of a pressure equalizing type in which in normal working the absorption solution is continuously circulated between the absorber and the boiler by means of a thermosyphon pump and which have a second auxiliary pump for absorption solution which may be started at will.

In accordance with my invention the auxiliary pump is used for conveying absorption solution for purposes other than absorption, more particularly for releasing controlling processes during the working of the apparatus. It is especially advantageous to convey this absorption solution to the evaporator for defrosting purposes.

My invention will be hereinafter more fully described partly with reference to the accompanying drawings from which the characteristic features of the invention will be seen.

Fig. 5 shows still another embodiment of the invention.

Figs. 6 and 7 show different possibilities of starting the additional pump.

Figure 1:
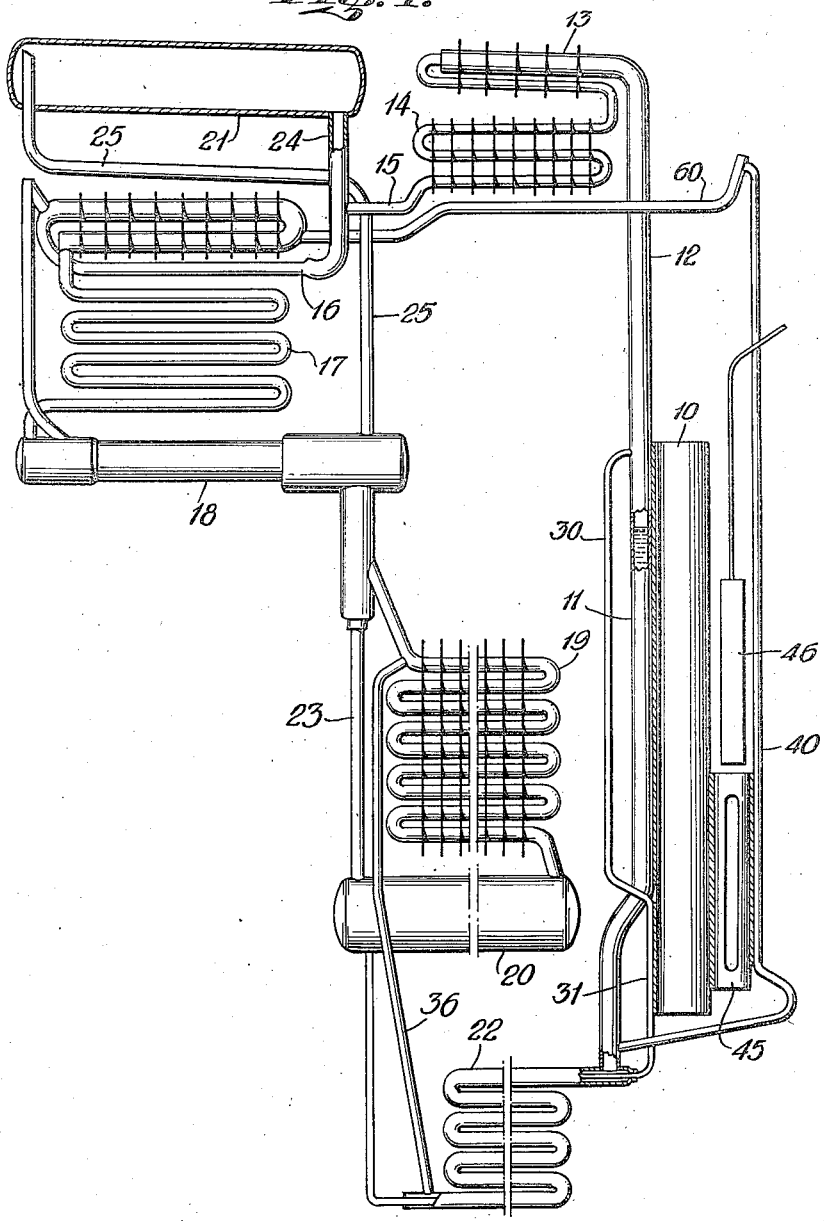
Fig. 1 shows diagrammatically an absorption refrigerating apparatus with the pump according to the invention.

In Fig. 1, 10 designates the heating tube of the refrigerating apparatus to be heated at will, said apparatus working, for example, with water, hydrogen and ammonia. The tubular boiler 11 connected in heat-conducting relation with the heating tube 10, as by welding, communicates in a manner known per se by the rising pipe 12, the rectifier 13 and the air-cooled condenser 14 through a conduit 15 and a U-seal 16 with the evaporator 17. The upper part of the evaporator is, in the usual manner, formed as a space cooler and provided with cooling fins. The lower spiral part serves for low temperature cooling, as for ice-making. The gas mixture evolved in the evaporator passes through the gas heat exchanger 18 by way of the conduit 23 to the absorber collector 20 and thence upwards through the coil absorber 19 in the usual manner back to the evaporator. Between the condenser 14 and the gas heat exchanger 18 is provided the usual pressure vessel 21 connected, on the one hand, by conduit 24 with the condensate conduit 15 and, on the other hand, by conduit 25 with the gas heat exchanger.

The solution degasified in the boiler enters the absorber coil 19 through the heat exchanger 22 and the conduit 36 and passes from the absorber collector 20 by way of the inner tube of the heat exchanger 22 to the pump 30. This pump is, at point 31, in heat-conducting connection with the heating tube 10. The function of apparatus of this kind is previously known.

According to the invention there is provided a special pump conduit 40 branched off from the lower part of the boiler 11. The pump tube 40 runs at its upper end into a conduit 60 which is connected to the upper part of the evaporator 17, but may run into the evaporator at another place. The lower part of the pump tube 40 is, by way of a slotted sleeve 45, connected with the heating tube 10, as by welding. The heat-transferring capacity of this sleeve 45 is so low or so reduced by the slots that, in normal cases, the heat transferred by way of the sleeve 45 to the pump conduit 40 does not suffice to start the pump 40. If, however, the heat transfer body 46 fitted into the sleeve 45 is lowered into this sleeve, the heat transfer will be so vigorous that the pump 40 will begin to work. This pump pumps the hot boiler solution into the conduit 60 and into the evaporator 17, which will cause the evaporator to be rapidly defrosted, since the boiler solution has a temperature varying between +130° and +180° C. This ensures a very rapid defrosting of the evaporator. On the completion of the defrosting process the transfer body 46 is again removed from the sleeve 45. The transfer body 46 may be moved in any manner, both by hand and thermostatically. Especially in the latter case the transfer body 46 is preferably relieved by a counter-weight, not shown.

Figure 2:
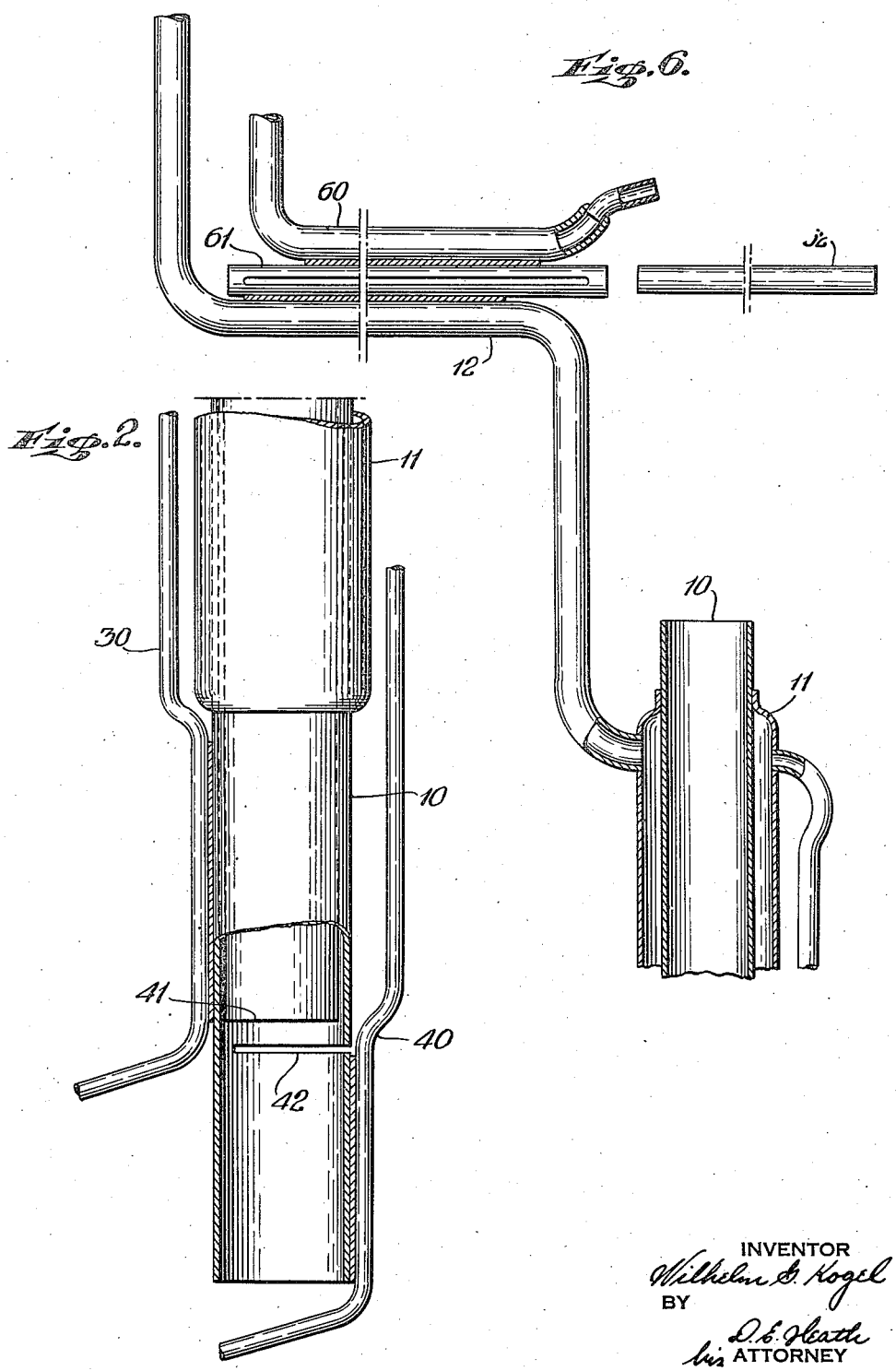
Figs. 2 and 3 show a further embodiment of the connection between the additional pump and its source of heat.

Fig. 2 shows another method of starting the additional pump. Like parts are designated in like fashion throughout.

In the embodiment of Fig. 2 the boiler 11 is shaped as a jacket surrounding the heating tube 10 and only partly shown. The lower end of heating tube 10 is provided with a slit 42 reducing the heat transfer of the heating tube. To the lower part of the heating tube 10 which thus, in normal working, receives little heat, the additional pump 40 is welded or, in some other manner, connected in heat-conducting relationship. This embodiment is especially suited to electric operation. In normal cases the electric heating cartridge 41 stands in the raised position shown in the figure, thus heating the circulating pump 30 and the interior of the boiler 11. In this position of the heating cartridge the heat transfer to the pump 40 is so slight that the latter does not run. If, however, the heating cartridge 41 is lowered by hand or thermostatically, if desired through the medium of levers and springs, the pump 40 will start and pump the hot solution according to Fig. 1 into the evaporator, since the pump is in connection not shown in the figure with the lower boiler part or the hot part of the liquid heat exchanger.

In this embodiment the lowering of the cartridge 41 will, besides, result in that, in a given case, the further boiling in the boiler or the operation of the circulating pump 30 will cease. When this circulation ceases, the gas circulation will also cease, thus still further hastening the defrosting of the evaporator.

Instead of making the heating cartridge 41 displaceable in height it is also possible to use a long cartridge with several windings of which the upper windings heat the boiler and the circulating pump, whereas the lower winding, which heats the pump 40, may be separately started or stopped by hand or thermostatically.

Figure 3:
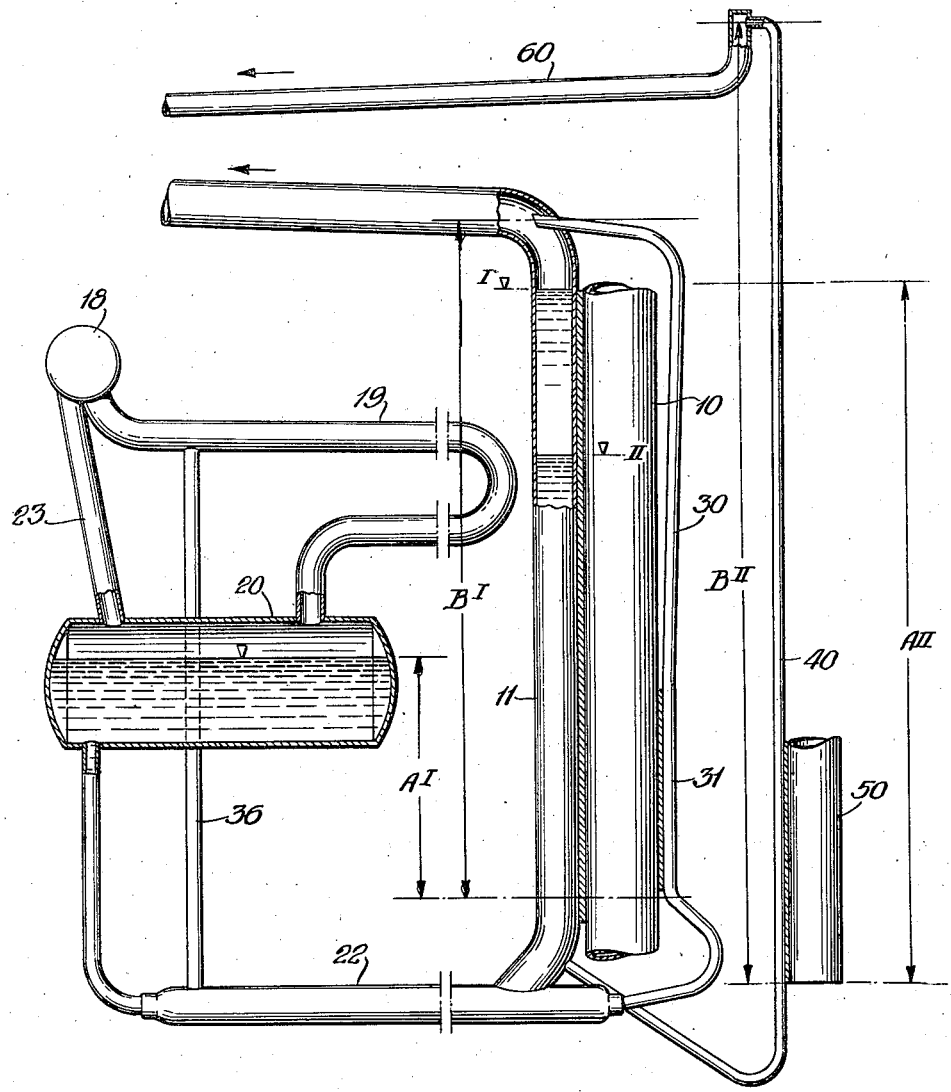

Fig. 3 shows essential parts of another embodiment of the apparatus, the variations in the liquid level during the working of the additional pump being more fully illustrated. The tubular boiler 11 and the circulating pump 30 are, as in Fig. 1, connected to the heating tube 10. The additional pump 40 is in heat-conducting connection with a special heating tube 50. The heating tube 50 may be heated in any suitable manner by the same means as the heating tube 10 or by other means. If the pump 40 is heated, it delivers, as in the preceding embodiment, into the conduit 60 and into the evaporator. In normal working the pump 30 conveys the absorption solution to level I, so that the solution, after overcoming the frictional resistances, may run through the conduit 36 into the upper part of the absorber coil 19. The reaction column of the pump 30 is designated by AI, and the head of elevation of the circulating pump by BI. The additional pump 40 works under more favourable pumping conditions. As it opens into the lower part of the boiler, its reaction column is equal to AII, whereas its head of elevation is designated by BII. This will make the pumping conditions of pump 40 more favourable than those of the circulating pump 30. As a result, more solution will, when the pump 40 starts, be pumped out of the boiler 11 than may be supplied by the circulating pump 30 which works less favourably. This will make it possible to lower the boiler level to the level II, when the additional pump 40 is running. If, however, the boiler level falls to level II, no more poor solution will run into the absorber coil. Thus, the gas mixture in the absorber will not be any further washed out. As a result, the differences of weight in the gas circulation will cease, and the gas circulation will stop, thus still further increasing the effect of the hot solution running through conduit 60 into the evaporator, as it is no longer possible that condensate will evaporate into circulating auxiliary gas, thus still continuing partly to supply cold.

Figure 4:
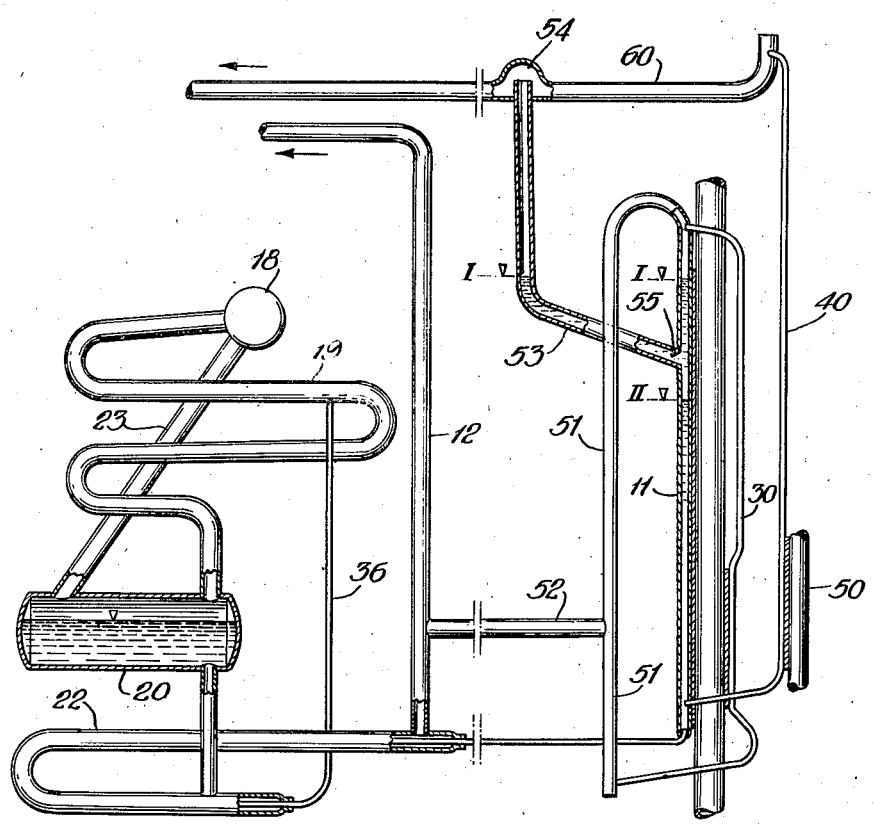
Fig. 4 shows a further embodiment in which, besides the absorption solution, also boiler vapours are used for defrosting the evaporator.

Fig. 4 shows an additional embodiment which makes possible a specially rapid defrosting. In this embodiment the boiler 11 is provided with an analyser. The boiler tube is bent into a goose-neck the second leg 51 of which opens by way of a conduit 52 into the vapour tube 12 leading to the condenser. The rich solution enters below into the tube 12, mixes in the tube 52 with the boiler vapour and enters from the lower end of the tube 51 into the pump 30. The additional pump 40 is, in this embodiment, likewise provided with a special heating sleeve 50. From the boiler 11 there is branched off a further conduit 53 almost immediately beneath the normal boiler level. This conduit opens into a dome 54 on conduit 60. At its lower end the conduit 53 is provided with a small abutment 55 which prevents gas bubbles which rise in the boiler from entering the conduit 53.

In normal working the liquid level in the boiler 11 and conduit 53 stands at level I. If, however, the additional pump 40 is started for defrosting purposes, the level in the boiler will, as described in connection with Fig. 3, fall to position II. The conduit 53 therefore runs empty, and all boiler vapours will enter the conduit 60 in which they will, together with the hot absorption solution, enter the evaporator and further hasten its defrosting. Also here the level in the boiler will sink so far that the circulation of the absorption solution will cease. On the completion of the defrosting process the heating of the pump 40 will be stopped in any of the ways described above.

Fig. 5 shows an embodiment in which the additional pump delivers not directly into the evaporator but to the highest point of the apparatus, in the embodiment into the pressure vessel 21 located above the condenser. The transport of the absorption solution to an especially high point makes it possible to use the transported solution also for other purposes. In the embodiment itself the transported solution runs from the pressure vessel 21 via the connecting conduit 24 to the liquid seal 16 of the evaporator, entering from thence into the evaporator not shown in the figure. However, the raised solution may, particularly in this case, be used also for other purposes.

An anti-corrosive agent is generally introduced into hermetically closed refrigerating apparatus of the kind now referred to. There are, however, places where the water vapours evolved condense. These condensing water vapours contain no protecting agent of chromate, for which reason rust may form. Such a place is the gas heat exchanger in which water vapours are deposited from the poor gas coming from the absorber at the change of temperature resulting from the cold gas mixture. It is now possible to use the solution raised by the additional pump and containing chromate for rinsing the gas heat exchanger, thus removing the water containing no protecting agent and, as the liquid is replaced by a solution containing chromate, preventing the gas heat exchanger from rusting on the inside. This additional advantage of the special pump 40 may be already obtained in the above-mentioned defrosting process, because the solution overflows from the evaporator into the heat exchanger, flowing from thence through the conduit 23 into the absorber collector.

However, it has previously also been proposed to reverse the gas circulation in apparatus in which auxiliary gas flows in the evaporator in co-current with the liquid refrigerant, so that auxiliary gas and refrigerant will flow in counter-current, by building up liquid columns in the apparatus, said columns causing the gas circulation to be reversed. To build up these liquid columns use may be made of the solution raised by the pump 40.

It has further been proposed to charge, in apparatus with a plurality of evaporators or a plurality of absorbers, the evaporators or absorbers with different amounts of refrigerant or absorption solution, respectively, likewise by building up liquid columns in the apparatus for the purpose of causing in this manner differences of pressure between the apparatus parts. Also for building up these liquid columns use may be made of the absorption solution raised by the pump 40 to a place located as high as possible.

However, it is also possible, as has also been proposed, to use the solution in order partly to throttle the gas circulation between the absorber and evaporator, thus changing the temperature of the evaporator.

To fulfil the three last-named tasks use must be made of liquid seals which are filled by the raised solution. In order to neutralize the controlling processes brought about in this manner, the liquid seals must therefore be again emptied.

Such a possibility is illustrated in Fig. 6 which shows the details required and a boiler 11 formed as a jacket. The controlling liquid seal is designated by 60 in this figure. If it is filled by the raised solution, this will produce the pressure-generating liquid columns or throttle the gas circulation. The deepest part of the liquid seal is, by way of a slotted heat transfer sleeve 61, in heat-conducting connection with the vapour conduit 12 rising from the boiler, in such a manner that the amount of heat transferred will not suffice to cause the liquid in the conduit 60 to boil. If, however, the heat transfer body 62 is introduced into the sleeve, the heat transfer will be so great that the liquid boils and the seal again opens, the pressure-producing liquid columns thus falling or the gas circulation being again completely opened.

Figure 7:
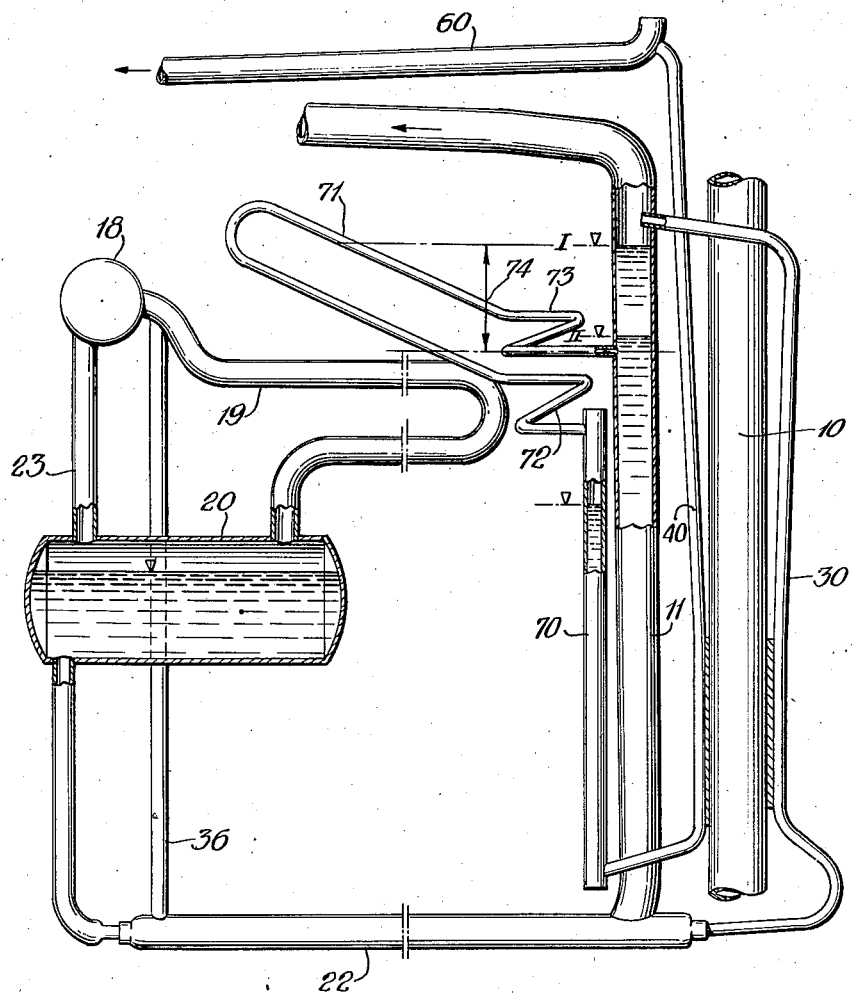

Fig. 7 shows an embodiment in which the additional pump is continuously in heat-conducting connection with the heating tube 10. The embodiment shows a tubular boiler which is not in direct heat-conducting contact with the heating tube so that all vapours passing to the condenser are formed in the pump 30. The pump 40 delivers further to the tube 60 leading to the evaporator. In this embodiment the pump 40 is not directly connected to the lower part of the boiler, but runs into a special standpipe 70. This standpipe 70 is, at its upper end, connected to the boiler by way of a U-tube 71 having two special turns 72, 73, so that the U-tube 71 may be tilted. During normal working the standpipe 70 and the pump 40 do not contain any liquid, because this liquid boils off owing to the heat supply, when the apparatus is started. If, however, the U-tube 71 is, in a manner known per se, tilted downwardly by hand or thermostatically, an amount of liquid dependent on the diameter of the standpipe 70 and the height 74 of the connection of the conduit 73 with the boiler will run out of the boiler into the standpipe 70. It is therefore possible to convey, in operation, a determined amount of boiler solution into the standpipe 70, said solution being then used by means of the pump 40 either for evaporating, defrosting or other controlling purposes mentioned above. As soon as the solution, when the U-tube 71 is depressed, has overflowed, the U-tube may be returned into its normal position.

Reference is made to applicant's divisional application, S. N. 636,822, filed December 22, 1945, which claims the subject matter disclosed in Figs. 2, 3, 5 and 6.

It will be obvious to those skilled in the art that various other changes may be made in the method and arrangement without departing from the spirit of the invention and therefore the invention is not limited to what is shown in the drawings and described in the specification but only as indicated in the claims.

What I claim is:

1. An absorption refrigeration system having a cooling element, an absorption liquid circuit in which the liquid is heated, a heater for heating the liquid in said circuit and another heat operated device connected with said circuit and said cooling element and operable when heat is supplied thereto for delivering absorption liquid from said circuit to said cooling element to quickly raise the temperature of the cooling element.

2. An absorption refrigeration system having a cooling element, an absorption liquid circuit in which the liquid is heated, a first gas lift pump for causing circulation of liquid in said circuit, and a second gas lift pump operable for delivering heated absorption liquid from said circuit to said cooling element to quickly raise the temperature thereof.

3. An absorption refrigeration system having a cooling element, an absorber, a generator, an absorption liquid circuit including said generator and said absorber, and a device operable for delivering absorption liquid from said circuit to said cooling element and simultaneously interrupting flow to said absorber of liquid in said circuit, thereby quickly raising the temperature of said cooling element.

4. An absorption refrigeration system having a cooling element, an absorption liquid circuit including a generator and an absorber, a first gas lift pump for causing circulation of liquid in said circuit, and a second gas lift pump operable to withdraw liquid from said circuit and deliver the withdrawn liquid to said cooling element, said circuit being so constructed and arranged that upon operation of said second pump, flow to said absorber of liquid in said circuit is interrupted, thereby quickly raising the temperature of said cooling element.

5. A method of refrigerating which includes circulating absorption liquid in a circuit, heating the liquid in one part of said circuit to expel therefrom refrigerant vapor, liquefying the expelled vapor, evaporating the liquid refrigerant to produce cold, absorbing the evaporated refrigerant by absorption liquid in another part of said circuit, and intermittently withdrawing absorption solution from said circuit and applying withdrawn liquid so that its sensible heat counteracts said cold, and simultaneously interrupting flow to said another part of absorption liquid in said circuit, all for the purpose of controlling a temperature condition affected by said cold, or quickly melting frost formed because of said cold.

6. An absorption refrigeration system having a circuit for absorbent liquid, a circuit for refrigerant, a generator common to the two circuits comprising a plurality of pipes, two of said pipes being joined to a third of said pipes in thermal contact therewith, the latter forming a heating flue, and said two pipes forming a boiler and a vapor lift for causing flow of liquid in said absorbent liquid circuit, respectively, a circuit for auxiliary pressure equalizing fluid, and a second vapor lift pump for causing a flow of fluid from the absorbent liquid circuit to the auxiliary fluid circuit.

7. An absorption refrigeration system having a circuit for absorbent liquid including a generator comprising a plurality of pipes, two of said pipes being joined to a third of said pipes in thermal contact therewith on lines substantially parallel to the longitudinal axis of said third pipe, the latter forming a heating flue, and said two pipes forming, one a boiler, and the other a vapor lift for causing flow of liquid in said circuit, said vapor lift pipe contacting the flue pipe at a level below the contact between the generator pipe and flue pipe.

8. An absorption system having a circuit for absorbent liquid including a generator comprising a plurality of pipes, two of said pipes being joined to a third of said pipes in thermal contact therewith on lines substantially parallel to the longitudinal axis of said third pipe, the latter forming a heating flue, and said two pipes forming, one a boiler, and the other a vapor lift for causing flow of liquid in said circuit.

9. An absorption refrigeration system as set forth in claim 8, in which said pipes are upright, and the line of contact of the vapor lift pipe with the flue pipe is materially shorter than the line of contact of the boiler pipe with the flue pipe.

10. An absorption refrigeration system containing refrigerant fluid, absorbent liquid, and auxiliary pressure equalizing fluid, and having a heat input section which includes a plurality of pipes, two of said pipes being joined to a third of said pipes in thermal contact therewith on lines substantially parallel to the longitudinal axis of said third pipe, the latter forming a heating conduit, and said two pipes forming elements in which refrigerant is expelled from solution in the absorbent by heat from said heating conduit, one of said two pipes also forming a vapor lift for promoting the circulation of absorbent liquid in the system.

11. An absorption refrigeration system comprising a circuit for auxiliary pressure equalizing fluid including an evaporator and an absorber, a circuit for absorbent liquid including said absorber and a boiler, a liquefier connected to receive refrigerant vapor from said boiler and to deliver liquid refrigerant to said evaporator, a pipe forming a heating conduit, a first vapor lift pipe having a part in thermal contact with said heating conduit and connected in said circuit for absorbent liquid to promote circulation of liquid in the circuit, and a second vapor lift pipe connected to receive liquid from said absorbent liquid circuit and, when in operation, to deliver liquid absorbent to said auxiliary fluid circuit, and a thermal conductive element operable to thermally connect and disconnect said second vapor lift pipe with said heating conduit.

12. An absorption refrigeration system as set forth in claim 11 in which the absorbent liquid delivered by said second vapor lift conduit, when the latter is in operation, enters the evaporator in said auxiliary fluid circuit.

13. An absorption refrigeration system as set forth in claim 11 in which said second vapor lift pipe is joined to said heating conduit by a slotted sleeve of which the thermal conductivity is insufficient to cause operation of said lift, and said thermal conductive element is a counter-weighted member vertically movable into and out of said sleeve.

14. An absorption refrigeration system as set forth in claim 11 in which said second vapor lift pipe is connected to said heating conduit by a slotted sleeve of which the heat conductivity is insufficient to cause operation of the lift, and said thermal conductive element is a member movable into and out of said sleeve.

15. An absorption refrigeration system comprising a circuit for auxiliary pressure equalizing fluid including an evaporator and an absorber, a circuit for absorbent liquid including said absorber and a boiler, a liquefier connected to receive refrigerant vapor from said boiler and deliver liquid refrigerant to said evaporator, a conduit connecting said boiler to said gas circuit, which conduit is closed to flow of vapor therethrough when liquid in said boiler is above a certain level, and a device operable to cause the liquid in said boiler to descend below said certain level and thereby permit flow of vapor from said boiler to said auxiliary fluid circuit.

16. An absorption refrigeration system as set forth in claim 15 in which said conduit is connected to said boiler at said certain level and a baffle is constructed and arranged to prevent entrance into said conduit of vapor formed in said boiler below said level.

17. An absorption refrigeration system as set forth in claim 15 in which said device for causing descent of liquid level in the boiler is a vapor lift pipe connected to receive liquid from said boiler and deliver the liquid into said evaporator.

18. An absorption refrigeration system as set forth in claim 15 in which said boiler is an upright pipe thermally contacting an upright heating flue on a line parallel to the longitudinal axis of said flue, and said circuit for absorbent liquid also includes a liquid circulation promotor comprising a vapor lift conduit formed by a second pipe having a part thermally connected to said flue on a line parallel to the longitudinal axis of the flue.

19. An absorption refrigeration system having a circuit for auxiliary pressure equalizing fluid including an evaporator and an absorber, a circuit for absorbent liquid including said absorber and a boiler, a liquefier connected to receive refrigerant vapor from said boiler and to deliver refrigerant liquid to said evaporator, a vapor liquid lift connected to deliver absorbent liquid to said auxiliary fluid circuit, and a device operable to start and stop supply of liquid from said liquid circuit to said lift.

20. An absorption refrigeration system as set forth in claim 19 in which said lift is connected so that liquid delivered thereby to said auxiliary fluid circuit enters said evaporator to cause defrosting thereof.

21. An absorption refrigeration system as set forth in claim 19 in which said device for starting and stopping supply of liquid to said lift is a liquid conductor which is tiltable and when tilted promotes overflow of liquid from said circuit to said lift.

WILHELM GEORG KÖGEL.